(12) United States Patent
Malwankar

(10) Patent No.: US 8,966,172 B2
(45) Date of Patent: Feb. 24, 2015

(54) PROCESSOR AGNOSTIC DATA STORAGE IN A PCIE BASED SHARED STORAGE ENVIROMENT

(75) Inventor: Kiron Balkrishna Malwankar, Saratoga, CA (US)

(73) Assignee: Pavilion Data Systems, Inc., Sunnyvale, CA (US)

( * ) Notice: Subject to any disclaimer, the term of this patent is extended or adjusted under 35 U.S.C. 154(b) by 288 days.

(21) Appl. No.: 13/355,823

(22) Filed: Jan. 23, 2012

(65) Prior Publication Data

US 2013/0191590 A1 Jul. 25, 2013
US 2014/0289462 A9 Sep. 25, 2014

Related U.S. Application Data

(60) Provisional application No. 61/560,224, filed on Nov. 15, 2011.

(51) Int. Cl.
*G06F 13/00* (2006.01)

(52) U.S. Cl.
USPC .................... 711/114; 710/1; 711/112

(58) Field of Classification Search
CPC combination set(s) only.
See application file for complete search history.

(56) References Cited

U.S. PATENT DOCUMENTS

| | | | |
|---|---|---|---|
| 6,055,603 A | 4/2000 | Ofer et al. | |
| 6,304,942 B1 | 10/2001 | DeKoning | |
| 6,345,368 B1 | 2/2002 | Bergsten | |
| 6,397,267 B1 * | 5/2002 | Chong, Jr. | 710/1 |
| 6,421,715 B1 | 7/2002 | Chatterjee et al. | |
| 6,425,051 B1 | 7/2002 | Burton et al. | |
| 6,564,295 B2 | 5/2003 | Okabayashi et al. | |
| 6,571,350 B1 | 5/2003 | Kurokawa et al. | |
| 6,647,514 B1 | 11/2003 | Umberger et al. | |
| 6,732,104 B1 | 5/2004 | Weber | |
| 6,732,117 B1 | 5/2004 | Chilton | |
| 6,802,064 B1 | 10/2004 | Yao et al. | |
| 6,915,379 B2 | 7/2005 | Honda et al. | |
| 6,965,939 B2 | 11/2005 | Cuomo et al. | |
| 6,988,125 B2 | 1/2006 | Elnozahy et al. | |
| 7,031,928 B1 | 4/2006 | Cochran | |
| 7,035,971 B1 | 4/2006 | Merchant | |
| 7,035,994 B2 | 4/2006 | Tanaka et al. | |
| 7,437,487 B2 | 10/2008 | Chikamichi | |
| 7,484,056 B2 | 1/2009 | Madnani et al. | |
| 7,653,832 B2 | 1/2010 | Faibish et al. | |

(Continued)

FOREIGN PATENT DOCUMENTS

EP 2309394 A2 4/2011
WO 2008070174 A2 6/2008

(Continued)

*Primary Examiner* — Charles Rones
*Assistant Examiner* — Han Doan
(74) *Attorney, Agent, or Firm* — Lowenstein Sandler LLP

(57) ABSTRACT

Disclosed are a system, a method and/or an apparatus of processor agnostic data storage in a PCIE based shared storage environment. In one aspect, a method includes processing a storage based request received at an adapter circuit of a controller device associated with a disk array to direct the storage based request to at least one of a processor of the disk array and a plurality of storage devices of the disk array. The method also includes routing, through an interface circuit of the controller device, the data request in the other format compatible with the storage device directly to at least one storage device of the plurality of storage devices of the disk array coupled to the controller device agnostic to a processor of the disk array to store a data associated with the data request based on a mapping table.

16 Claims, 11 Drawing Sheets

(56) References Cited

U.S. PATENT DOCUMENTS

| | | |
|---|---|---|
| 7,743,191 B1 | 6/2010 | Liao |
| 7,769,928 B1 | 8/2010 | Tran et al. |
| 7,836,226 B2 | 11/2010 | Flynn et al. |
| 7,870,317 B2 | 1/2011 | Suresh |
| 7,958,302 B2 | 6/2011 | Cherian et al. |
| 8,019,940 B2 | 9/2011 | Flynn et al. |
| 8,588,228 B1 * | 11/2013 | Onufryk et al. ............... 370/389 |
| 2001/0013059 A1 | 8/2001 | Dawson et al. |
| 2002/0035670 A1 | 3/2002 | Okabayashi et al. |
| 2002/0087751 A1 * | 7/2002 | Chong, Jr. ....................... 710/33 |
| 2002/0144001 A1 * | 10/2002 | Collins et al. ................. 709/250 |
| 2002/0147886 A1 * | 10/2002 | Yanai et al. ................... 711/112 |
| 2003/0074492 A1 * | 4/2003 | Cochran ........................... 710/5 |
| 2003/0126327 A1 * | 7/2003 | Pesola et al. .................. 711/112 |
| 2003/0182504 A1 | 9/2003 | Nielsen et al. |
| 2004/0010655 A1 | 1/2004 | Tanaka et al. |
| 2004/0047354 A1 | 3/2004 | Slater et al. |
| 2005/0125426 A1 | 6/2005 | Minematsu |
| 2005/0154937 A1 | 7/2005 | Achiwa |
| 2005/0193021 A1 | 9/2005 | Peleg |
| 2006/0156060 A1 | 7/2006 | Forrer, Jr. et al. |
| 2006/0265561 A1 * | 11/2006 | Boyd et al. .................... 711/163 |
| 2007/0038656 A1 | 2/2007 | Black |
| 2007/0083641 A1 | 4/2007 | Hu et al. |
| 2007/0168703 A1 | 7/2007 | Elliott et al. |
| 2007/0233700 A1 | 10/2007 | Tomonaga |
| 2008/0071999 A1 | 3/2008 | Boyd et al. |
| 2008/0118065 A1 * | 5/2008 | Blaisdell et al. .............. 380/255 |
| 2008/0140724 A1 | 6/2008 | Flynn et al. |
| 2008/0216078 A1 | 9/2008 | Miura et al. |
| 2009/0019054 A1 | 1/2009 | Mace et al. |
| 2009/0150605 A1 | 6/2009 | Flynn et al. |
| 2009/0177860 A1 | 7/2009 | Zhu et al. |
| 2009/0248804 A1 | 10/2009 | Ohtani |
| 2009/0320033 A1 | 12/2009 | Gokhale et al. |
| 2010/0100660 A1 | 4/2010 | Tamagawa |
| 2010/0122021 A1 | 5/2010 | Lee et al. |
| 2010/0122115 A1 | 5/2010 | Olster |
| 2010/0223427 A1 | 9/2010 | Chan et al. |
| 2010/0241726 A1 | 9/2010 | Wu |
| 2010/0262760 A1 | 10/2010 | Swing et al. |
| 2010/0262772 A1 | 10/2010 | Mazina |
| 2011/0022801 A1 | 1/2011 | Flynn |
| 2011/0035548 A1 | 2/2011 | Kimmel et al. |
| 2011/0055458 A1 | 3/2011 | Kuehne |
| 2011/0060882 A1 | 3/2011 | Efstathopoulos |
| 2011/0060887 A1 * | 3/2011 | Thatcher et al. .............. 711/171 |
| 2011/0060927 A1 | 3/2011 | Fillingim et al. |
| 2011/0078496 A1 | 3/2011 | Jeddeloh |
| 2011/0087833 A1 | 4/2011 | Jones |
| 2011/0179225 A1 | 7/2011 | Flynn et al. |
| 2011/0219141 A1 | 9/2011 | Coile et al. |
| 2011/0219208 A1 | 9/2011 | Asaad et al. |
| 2011/0289261 A1 | 11/2011 | Candelaria |
| 2011/0289267 A1 | 11/2011 | Flynn et al. |
| 2011/0296133 A1 | 12/2011 | Flynn et al. |
| 2011/0296277 A1 | 12/2011 | Flynn et al. |
| 2012/0011340 A1 | 1/2012 | Flynn et al. |

FOREIGN PATENT DOCUMENTS

| | | |
|---|---|---|
| WO | 2010117929 A1 | 10/2010 |
| WO | 2011019596 A2 | 2/2011 |
| WO | 2011031903 A2 | 3/2011 |
| WO | 2011106394 A2 | 9/2011 |

* cited by examiner

PROCESSOR AGNOSTIC DATA STORAGE IN A PCIE BASED SHARED STORAGE ENVIROMENT

RELATED APPLICATIONS

This application claims the benefit of U.S. Provisional Application No. 61/560,224 filed on Nov. 15, 2011.

FIELD OF TECHNOLOGY

This disclosure relates generally to the field of data storage, and in particular to processor agnostic data storage in a PCIE based shared storage environment.

BACKGROUND

Networked storage arrays may provide an enterprise level solution for secure and reliable data storage. The networked storage array may include a processor (x86 based CPU) that handles the input/outputs (IOs) associated with storage devices in the networked storage array. The number of IOs that the processor can handle may be limited by the compute power of the processor. The advent of faster storage devices (e.g., solid state memory devices) may have increased the number of IOs associated with the storage devices (e.g., from approximately thousands of IOs to millions of IOs). The limited computing power of the processor may become a bottleneck that prevents an exploitation of all the benefits associated with the faster storage devices.

A user may experience significant delays in accessing data from the networked storage arrays due to the processor bottleneck. The delay in access of data may cause the user to get frustrated (e.g., waiting for a long time to access a simple word document). The user may have to waste valuable work time waiting to access the data from the networked storage array. The delay in accessing the data from the networked storage arrays due to the processor bottleneck may even reduce a user's work productivity. The loss of productivity may result in a monetary loss to an enterprise associated with the user as well.

SUMMARY

Disclosed are a system, a method and/or an apparatus of processor agnostic data storage in a PCIE based shared storage environment. In one aspect, a method includes processing a storage based request received at an adapter circuit of a controller device associated with a disk array from a host machine that is at a remote location from the disk array through a network via the controller device to direct the storage based request to at least one of a processor of the disk array and a number of storage devices of the disk array. The method includes distinguishing a nature of the storage based request to be at least one of a data request and a control request via a logic circuit of the controller device through decoding the storage based request based on a meta data of the storage based request. Also the method includes converting a format of the data request to another format compatible with the number of storage devices through the logic circuit of the controller device. Further the method includes routing, through an interface circuit of the controller device, the data request in the other format compatible with the storage device directly to at least one storage device of the number of storage devices of the disk array coupled to the controller device agnostic to a processor of the disk array to store a data associated with the data request based on a mapping table, residing in a memory of the controller device that is mapped in a memory of the disk array, that represents an association of the at least one storage device of the number of storage devices to the controller device.

In another aspect, a controller device includes an adapter circuit to receive a storage based request from a host machine that is at a remote location from the disk array through a network to direct the storage based request to at least one of a processor of the disk array and a number of storage devices of the disk array. The controller device further includes a logic circuit coupled to the adapter circuit, to distinguish a nature of the storage based request to be at least one of a data request and a control request through decoding the storage based request based on a meta data of the storage based request. The logic circuit may convert a format of the data request to another format compatible with the number of storage devices. The controller device also includes an interface circuit coupled to the logic circuit to route the data request in the other format compatible with the storage device to at least one storage device of the number of storage devices of the disk array coupled to the controller device agnostic to a processor of the disk array to store a data associated with the data request based on a mapping table, residing in a memory of the controller device that is mapped in a memory of the disk array, that represents an association of the at least one storage device of the number of storage devices to the controller device. At least one storage device of the number of storage devices is a Peripheral Component Interconnect Express (PCIE) based solid state storage device. Also, the other format that is compatible with the at least one storage device of the number of storage devices is an NVM Express (NVME) format.

In yet another aspect, a system includes a host machine to transmit a storage based request associated with an application executed on the host machine. The system includes a network coupled to the host machine. The system further includes a disk array coupled to the network to receive the storage based request from the host machine. The disk array includes an adapter circuit to receive a storage based request from a host machine that is at a remote location from the disk array through a network to direct the storage based request to at least one of a processor of the disk array and a number of storage devices of the disk array. The disk array further includes a logic circuit coupled to the adapter circuit, to distinguish a nature of the storage based request to be at least one of a data request and a control request through decoding the storage based request based on a metadata of the storage based request. The logic circuit may convert a format of the data request to another format compatible with the number of storage devices. The disk array includes an interface circuit coupled to the logic circuit to route the data request in the other format compatible with the storage device to at least one storage device of the plurality of storage devices of the disk array coupled to the controller device agnostic to a processor of the disk array to store a data associated with the data request based on a mapping table, residing in a memory of the controller device that is mapped in a memory of the disk array, that represents an association of the at least one storage device of the plurality of storage devices to the controller device. At least one storage device of the plurality of storage devices is a Peripheral Component Interconnect Express (PCIE) based solid state storage device. The other format that is compatible with the at least one storage device of the plurality of storage devices is an NVM Express (NVME) format.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

In an enterprise environment, numerous servers may require reliable and/or secure data storage. Data from the servers may be stored through a shared storage system. The shared storage may provide a reliable and/or secure data storage through facilitating storage backup, storage redundancy, etc. In one embodiment, in the shared storage system, the servers may be connected to disk arrays through a network. The disk arrays may have a number of storage devices on which the servers may store data associated with the servers. Disk arrays may be storage systems that link a number of storage devices. The disk arrays may be advanced control features, to link the number of storage devices to appear as one single storage device to the server. Storage devices associated with the disk arrays may be connected to the servers through various systems such as direct attached storage (DAS), storage area network appliance (SAN) and/or network attached storage (NAS).

Figure 1:
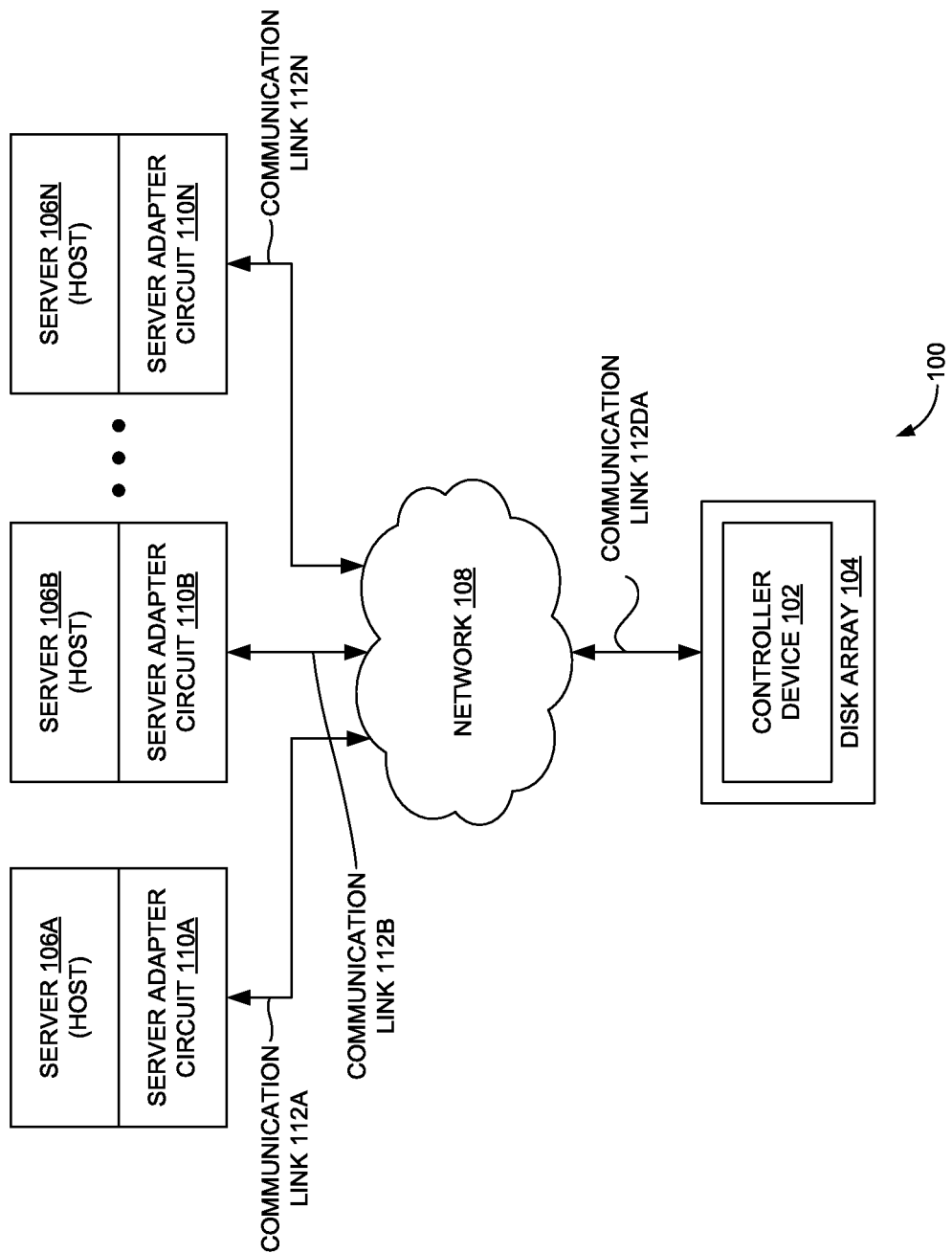
FIG. 1 illustrates data storage on a shared storage system through the controller device, according to one or more embodiments.

FIG. 1 illustrates data storage on a shared storage system through the controller device, according to one or more embodiments. In particular FIG. 1 illustrates a number of servers 106*a-n*, server adapter circuits 110*a-n*, network 108, communication links 112*a-n*, a disk array 104 and/or a controller device 102.

In one or more embodiments, a number of server's 106*a-n* may be connected to a disk array 104 through a network 108 via the communication links 112*a-n*. The shared storage system 100 may be described by referring to one server 106*a* connected to the disk array 104 through the network 108 via the communication link 112*a* merely for ease of description.

In one embodiment, the server 106*a* may be a data processing device. In one embodiment, the data processing device may be a hardware device that includes a processor, a memory (not shown in FIG. 1) and a server adapter circuit 110*a-n*. In one embodiment, the server 106 may be an x86 based server.

In one embodiment, the server 106*a* may connect to a network 108 through the server adapter circuit 110*a*. The server adapter circuit may be inter alia a network interface card (NIC), a host bus adapter (HBA) and/or a converged network adapter (CNA). In one embodiment, the communication link 112*a* may connect the server 106*a* to the network 108. In one embodiment, the communication link 112*a* may be Ethernet, a Fiber Channel and/or Fiber Channel over Ethernet link based on the server adapter circuit 110*a* associated with the server 106*a*.

In one embodiment, the data processing device (e.g., server 106*a*) may be a physical computer. In one embodiment, the data processing device may be a mobile and/or stationary (desktop computer) device. In another embodiment, the server 106*a* may be software disposed on a non-transient computer readable medium. The software may include instructions which when executed through a processor may perform requested services. In one embodiment, the server 106*a* may be an application server, a web server, a name server, a print server, a file server, a database server etc. The server 106*a* may be further described in FIG. 2A.

In one embodiment the server 106*a* may be connected to a disk array to store data associated with the server 106*a*. In one embodiment, the network 108 may be a storage area network (SAN) and/or a local area network (LAN). In one embodiment, the server 106*a* and/or the disk array 104 may be connected to the network 108 through the communication link 112*a* and/or 112*da* respectively. In one embodiment, the disk array may be connected to the network through a Ethernet, Fiber Channel (FC) and/or a fiber channel over Ethernet based communication link.

In one embodiment, the disk array 104 may be a storage system that includes a number of storage devices. The disk array 104 may be different from "just a bunch of disks" (JBOD), in that the disk array 104 may have a memory and advanced functionality such as inter alia redundant array of Independent Disks (RAID) and virtualization. The disk array 104 may take a number of storage devices and makes a virtual storage device (not shown in FIG. 1). In one or more embodiments, the virtual storage device may appear as a physical storage device to the server 106*a*. In one embodiment, the data from the server 106*a* may be stored in a portion of the virtual storage disk. In one embodiment, the disk array 104 may be a block based storage area network (SAN) disk array. In another embodiment, the disk array may be a file based NAS disk array.

In one embodiment, the disk array 104 may include a controller device 102. The controller device 102 may be an interface between the server 106*a* and the storage devices associated with the disk array 104. In one embodiment, the storage devices may be solid state drive (SSD). In one embodiment, storage device may be a PCIe (Peripheral Component Interconnect—Express) based SSD. In one embodiment, the storage device may be a PCIe disk of a 2.5" form-factor and operate based on the NVMe protocol. PCIe may be a computer expansion card standard. The PCIe solid state drives may be storage drives designed based on the PCIe standard. SSD form factor specification may define the electrical and/or mechanical standard for a PCIe connection to the existing standard 2.5" disk drive form factor. An NVMe standard may define a scalable host controller interface designed to utilize PCIe based SSDs.

In one embodiment, the server 106*a* may have a storage based request. In one embodiment, the storage based request may be associated with an application running on a server (e.g., host machine). In one embodiment, the storage based request may be associated with a client server operation (e.g., client request where the client is coupled to the server [not shown in Figure]. In one embodiment, the storage based request may include a data request and/or a control request. In one embodiment, the data request may be associated with a data that the server 106a may need to store in the disk array 104. The data request may include a request to write a data to a storage device of the disk array 104 and/or read a data from a storage device of the disk array 104. In one embodiment, the control request from the server 106a may be associated with checking a status of the storage disks associated with the disk array 104. In one embodiment, an example of a control request may be when a server 106a requests the health of the storage devices, a total storage space available etc.

In the embodiment of FIG. 1, the server 106a may forward a storage based request to the disk array through the network 108 via a communication link 112a, in one or more embodiments, the controller device 102 may receive the storage request from the server 106a, in one or more embodiments, the controller device 102 may process the storage based request. In one embodiment, the controller device 102 may distinguish the storage based request through decoding the storage based request. The controller device 102 may distinguish the storage based request as a control request and/or a data request. In one embodiment, the controller device 102 may convert the data request to a format compatible with the storage device of the disk array 104. In one embodiment, the controller device 102 may determine where the storage based request may be forwarded to, based on whether the storage request is distinguished to be a control request and/or a data. request, in one embodiment, based on a completion of the storage based request the controller device 102 of the disk array 104 may inform the respective completion of the server 106a. The disk array 104 may be further described in FIG. 3.

Figure 3:
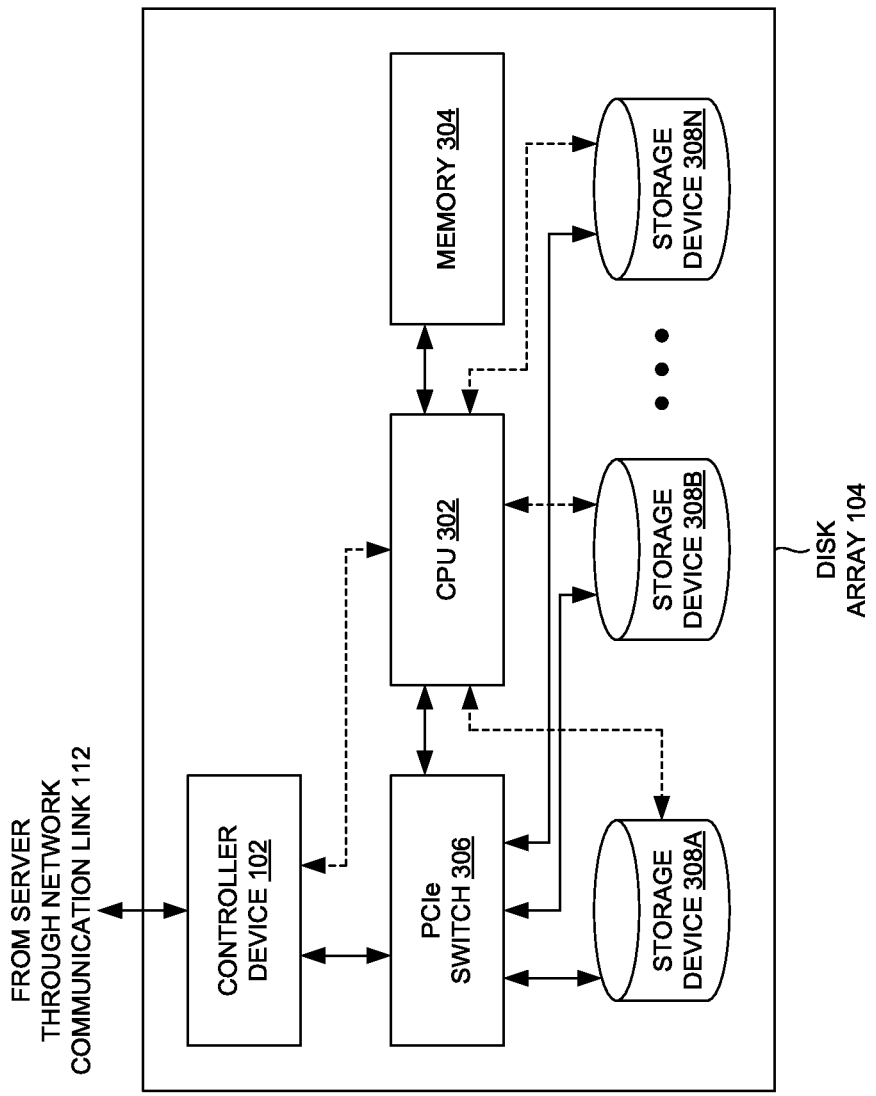
FIG. 3 illustrates an exploded view of the disk array of FIG. 1, according to one or more embodiments.

Now refer to FIG. 3 and FIG. 1. FIG. 3 illustrates an exploded view of the disk array of FIG. 1, according to one or more embodiments. In particular, FIG. 3 illustrates a controller device 102, a switch 306, a processor (CPU) of the disk array 302, a memory 304, a communication link 112 and/or a number of storage devices 308a-n.

In one embodiment, data from the server 106 may be stored in the number of storage devices 308a-n of the disk array 104. In one embodiment, the storage devices 308a-n may be linked together to appear as one virtual storage device through the processor of the disk array 302. In one embodiment, the total storage space of the virtual storage device may be equal to combination of the storage space of the number of storage devices 308a-n that are linked together. In one embodiment, total storage space associated with the number of storage devices 308a-n may be partitioned between the servers 106a-n through the processor of the disk array 302. Each server of the number of servers 106a-n may be assigned an addressable space in the number of storage devices 308a-n through the processor of the disk array 302. In one embodiment, storage space assigned to each server of the number of servers 106a-n may be spread among different storage devices 308 of the number of storage devices 308a-n. In one embodiment, the servers 106a-n may access (e.g., address) the number of storage devices 308a-n through virtual addresses assigned by the processor of the disk array 302. In one embodiment, the processor 302 may translate the virtual address to a physical address. In one embodiment, all the address translations (virtual to physical) may be recorded in a translation table. In one embodiment, the processor 302 may send the translation table to the controller device 102. In one embodiment, the translation table may reside in the controller device. In one embodiment, the processor may transfer the address translation. In one embodiment, the processor 302 may be root complex.

In one embodiment, when the disk array 104 powers up, the processor 302 may send a discovery request to identify the different devices associated with the disk array 104. In one embodiment, every device associated with the disk array 104 may respond to the discovery request of the processor 302. Based on the response, the processor 302 may have information regarding the number of storage devices 308a-n such as the total storage space associated with the number of storage devices 308a-n, health of each storage device, etc. In one embodiment the processor of the disk array 302 may divide the total addressable memory to allocate space to different devices that request addressable space. In one embodiment, all the devices of the disk array may be memory mapped. The division and/or mapping of the addressable space may reside in the memory 304 and/or the processor 302. In one embodiment, the memory 304 may be a transient and/or non-transient memory.

In one embodiment, the processor 302 may associate the controller device 102 with at least one of the number of storage devices 308a-n. In one embodiment, the processor may associate the server 106 with at least one of the number of storage devices 308a-n through associating the controller device 102 to at least one of the number of storage devices 308a-n. In one embodiment, the processor 302 may record the association of the controller device 102 and/or the server 106 with at least one of the number of storage devices 308a-n in a mapping table. In one embodiment, the mapping table (not shown in FIG. 3) may be forwarded to the controller device 102. In one embodiment, the mapping table may reside in the controller device 102. In an example embodiment, the server 106a may be allocated addressable space in storage device 1 308a and addressable space in storage device 2 308b. In the example embodiment, the mapping table residing in the controller device 102 (generated through the processor 302 and forwarded to the controller device 102) may have an entry that shows the mapping of the server 106a to the storage device 1 308a and storage device 2 308b.

In one embodiment, the controller device 102 may be connected to the number of storage devices 308a-n through a switch 306. In one embodiment the switch 306 may be part of the CPU 302. In one embodiment, the switch 306 may be an interface between the controller device 102, the number of storage devices 308a-n, and/or processor of the disk array 302. In one embodiment, the switch 306 may transfer communication between the controller device 102, the number of storage devices 308a-n, and/or processor of the disk array 302. In one embodiment, the switch 306 may be a PCIe switch. In one embodiment, the PCIe switch 306 may direct communications between the controller device 102 and the number of PCIe storage devices (e.g., number of storage devices 308a-n). In another embodiment of FIG. 3, the disk array may include number of controller devices (102a-n) as well. The number of controller devices 102a-n may be connected to the number of storage devices 308a-n through the switch 306 which is described later in the embodiment of FIG. 8. In one embodiment, the storage devices 308a-n may be PCIe solid state drives. In one embodiment, the data from the server 106 may be stored in the storage devices 308a-n (e.g., NVMe based PCIe SSDs).

In one embodiment, storage based requests may be sent from the server 106 to the disk array. In one embodiment, the storage based request may be a data write request, data read request and/or control request. In one embodiment, the controller device 102 of the disk array may receive the storage based request. In one embodiment, the controller device 102 may process the storage based request. The controller device 102 may process the storage based request through an NVMe based paired queue mechanism.

In one embodiment, a paired queue may include a submission queue and a completion queue (not shown in FIG. 3). In one embodiment, the submission queue may be a circular buffer with a slot size of n-bytes. In one embodiment, slot size may be determined by the size of the command that may be written in the submission queue. In one embodiment, the size of the command may be determined by the NVMe standard. In one embodiment, the submission queue may be used by the controller device 102 to submit commands for execution by the storage device 308. In one embodiment, the storage device 308 may retrieve the commands and/or requests from the submission queue to execute them. In one embodiment, the commands and/or requests may be fetched from the submission queue in order. In one embodiment, the storage device 308 may fetch the commands and/or requests from the submission queue in any order as desired by the storage device 308. In one embodiment, the commands and/or requests may be processed by the storage device 308 in any order desired by the storage device 308. In one embodiment the completion queue may be a circular buffer with a slot size of n-bytes used to post status for completed commands and/or requests. In one embodiment, once the storage device completes a command and/or request, the completion status is written in the completion queue and the storage device 308 issues an interrupt to the controller device 102 to read the completion status and forward it to the server 106. In one embodiment, the paired queue mechanism may allow a number of controller devices 102a-n to access a single storage device 308 (e.g., 308a). In one embodiment, the single storage device 308 may be substantially simultaneously accessed by the number of controller devices 102a-n based on how the entry in the submission queue is processed. In one embodiment simultaneous access may refer to the ability to write into the queue substantially simultaneously (disregarding the delay in writing to the queue and the delay to write to the queue in order which may be negligible). In one embodiment, each controller device 102 (e.g., 102a) of the number of controller devices 102a-n (not shown in Figure) may be associated with a number of storage devices 308a-n based on the paired queue mechanism.

In one embodiment, each storage device of the number of storage devices 308a-n may be associated with a submission queue and a completion queue. In one embodiment, the submission queue and the completion queue may be mapped to reside locally in the controller device 102. In one embodiment, the processor 302 may map the paired queues associated with the storage device to the controller device 102. In one embodiment, a mapping of the paired queue associated with a storage device to the controller device may be recorded in an interrupt table. In one embodiment, the processor 302 may generate the interrupt table. In one embodiment, the processor 302 may forward the interrupt table to the associated storage device. In one embodiment, the interrupt table may reside in the storage device.

In one embodiment, the paired queues reside locally in a memory of the controller device 102. The controller device may be memory mapped. Similarly, the translation table and the mapping table residing in the controller device 102 may all be stored in a memory of the controller device 102. In one embodiment, the processor 302 may generate and/or set up the paired queues. The controller device 102 may be described in FIG. 4.

Figure 4:
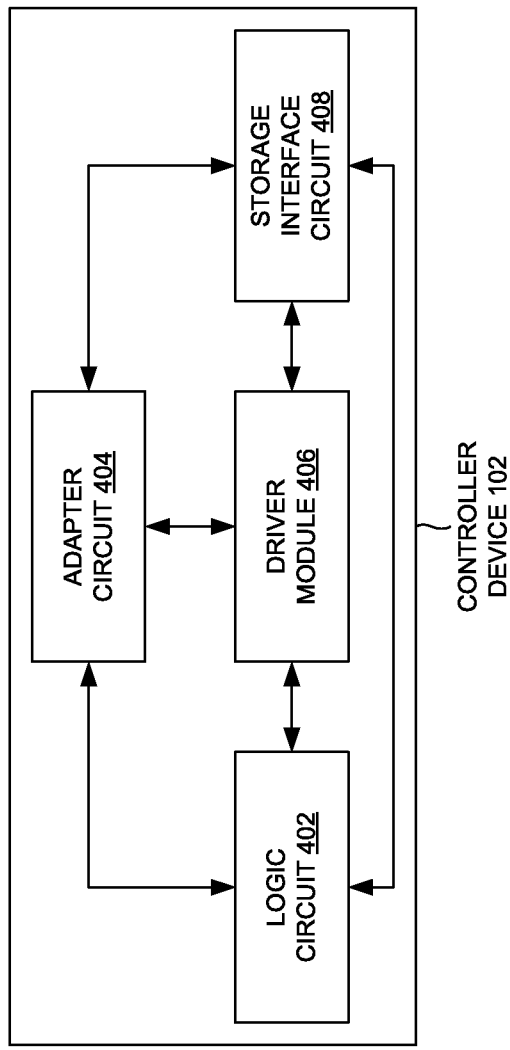
FIG. 4 illustrates an exploded view of the controller device of FIG. 1, according to one or more embodiments.

FIG. 4 illustrates an exploded view of the controller device of FIG. 1, according to one or more embodiments, in particular FIG. 4 illustrates an adapter circuit 404, a logic circuit 402, a driver module 406 and/or a storage interface circuit 408.

In one or more embodiments, the controller device 102 may include an adapter circuit 404, a logic circuit 402, a driver module 406 and/or a storage interface circuit 408. In one embodiment, a storage based request from the server 106 may be received by the controller device 102. In one embodiment, the storage based request may be received through the adapter circuit 404 of the controller device 102. In one embodiment, the adapter circuit 404 of the controller device 102 may be the interface of the controller device 102 to connect to the network 108. In one embodiment, the adapter circuit 404 may be a HBA, NIC and/or a CNA. In one embodiment, the interface may be FC MAC (Media Access Control), Ethernet MAC and/or FCoE MAC to address the different network interfaces (e.g., FC, Ethernet and/or FCoE). In one embodiment, the adapter circuit 404 may manage protocol specific issues. In one embodiment, the adapter circuit 404 may forward the storage based request to the logic circuit 402. In one embodiment, the controller device 102 may be included in the disk array 104. In one embodiment, the controller device 102 may be included in the server 106 (e.g., host machine).

In one embodiment, the logic circuit 402 may receive the storage based request forwarded from the adapter circuit 404. In one embodiment, the logic circuit 402 may process the storage based request to distinguish a nature of the storage based request. In one embodiment, the storage based request may be a data request and/or a control request. In one embodiment, the logic circuit 402 may distinguish the nature of the storage based request through decoding the storage based request. In one embodiment, the logic circuit 402 may terminate the network protocol. In one embodiment, the logic circuit 402 may provide protocol translation from the network protocol to the storage device based protocol. In one embodiment, the logic circuit 402 may translate the network protocol to an NVM Express protocol. In one embodiment, the logic circuit 402 may convert a format (e.g., network protocol FC, iSCSI, etc.) of the data request to another format compatible with the storage device 308 (e.g., NVME). In one embodiment, the protocol conversion of the control request may be implemented by a driver module running on the processor 302. In one embodiment, the driver module 406 of the controller device may be a data request based driver module. The driver module 406 may be a NVME driver module. The control request based driver may run on the processor 302. In one embodiment, the NVME driver may be separated between the controller device 102 and the processor 302.

In one embodiment, the logic circuit 402 may direct the data request compatible with the storage device 308 to the storage device 308 of the disk array 104 coupled to the controller device 102 agnostic to a processor 302 of the disk array 104 based on the mapping table residing in the memory (e.g., memory mapped) of the controller device 102. In one embodiment, when the logic circuit 402 distinguishes the storage based request to be a data request, the logic circuit 402 converts the data request to an NVME command corresponding to the data request. In one embodiment, the NVME command may be written in the submission queue of a paired queue residing in the controller device 102. In one embodiment, if the logic circuit 402 distinguishes the storage based request to be a control request, then the logic circuit 402 forwards the control request to the processor 302. The processor 302 then handles the control request. In one embodiment, the data request may be processed agnostic to the processor 302. In one embodiment, the controller device 102 directly processes the data requests without involving the processor 302. Handling of the data request and control request may be further described in FIG. 6 and FIG. 7A-FIG. 7B. In one embodiment, the logic circuit 402 may route the data request directly to the appropriate storage device 308 by-passing the processor 302. In one embodiment, the logic circuit 402 of the controller device 102 may route the data requests directly to the appropriate storage device 308 based on the mapping table that resides in the controller device 102. In one embodiment, the mapping device illustrates a mapping of each storage device to respective controller device.

In one embodiment, the storage interface circuit 408 may provide an interface to the switch 306. The switch 306 may be a PCIe switch. In one embodiment, the storage interface circuit 408 may be a multi-function PCIe end-point. In one embodiment, the PCIe end-point (e.g., storage interface circuit 408) may act as a master. In one embodiment, the controller device may communicate to the storage device through a peer to peer mechanism. In one embodiment, the storage device 308 may be the target. In one embodiment, the storage device 308 may be the master. In one embodiment, the storage interface circuit 408 may issue commands associated with the data request. The commands may be written into the submission queue for further processing.

In one embodiment, the driver module 406 may be a hardware circuit. In one embodiment, the driver module 406 may be a software module. In one embodiment, the driver module 406 (software module) may be a set of instructions that when executed may cause the adapter circuit 404, the logic circuit 402 and/or the storage interface circuit 408 to perform their respective operations. The driver module 406 may be further described in FIG. 5.

Figure 5:
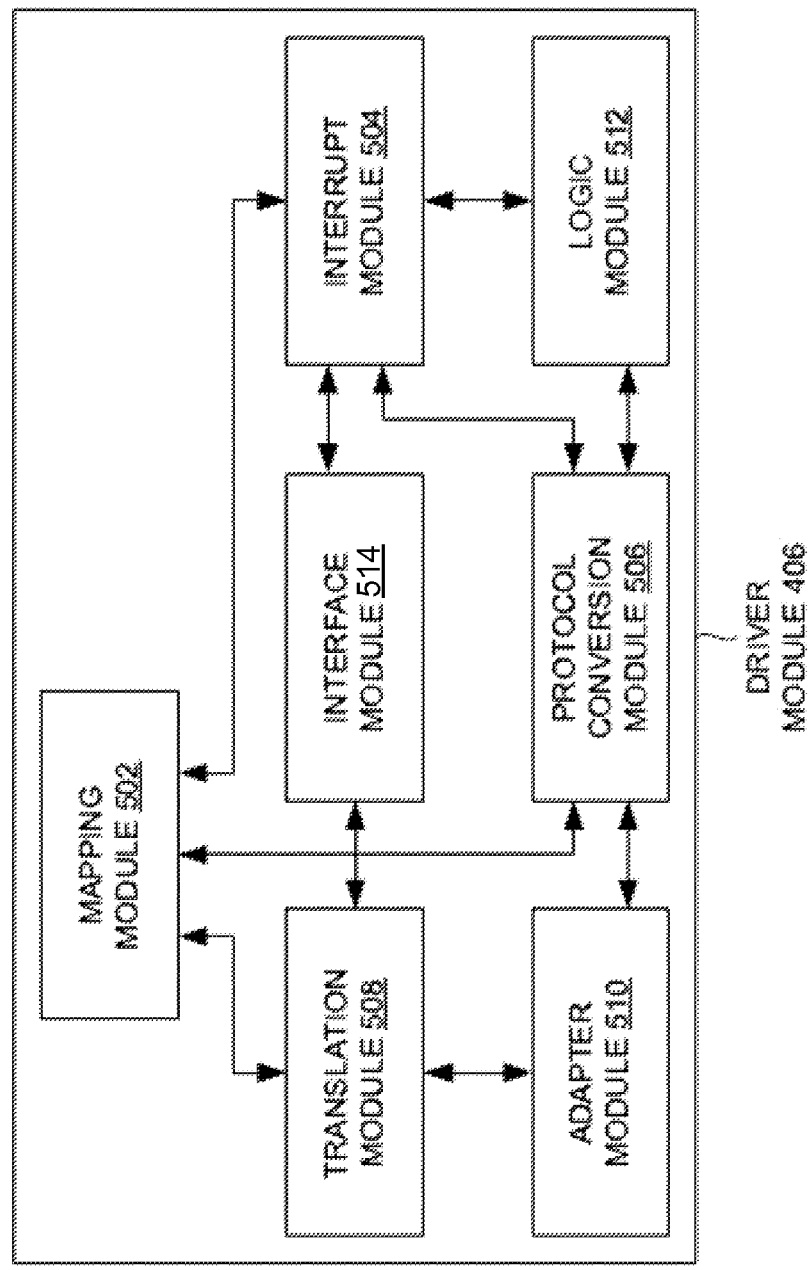
FIG. 5 illustrates an exploded view of the driver module of FIG. 4, according to one or more embodiments.

Now refer to FIG. 5, FIG. 4 and FIG. 1. FIG. 5 illustrates an exploded view of the driver module of FIG. 4, according to one or more embodiments. In particular FIG. 5 illustrates a mapping module 502, an interrupt module 504, a protocol conversion module 506, a translation module 508, the adapter module 510, the logic module 512 and/or the storage interface module 514.

In one embodiment, the driver module may be a set of instructions which when executed may cause the various circuits of the controller device 102 to perform their respective operations as described in FIG. 4. In one embodiment, the adapter module 510 may enable the adapter circuit 404 to manage protocol specific issues. In one embodiment, the adapter module 510 of the driver module 406 may cause the adapter circuit 404 to receive the storage request from the server 106 via the network 108. The adapter module 510 may enable the adapter circuit to forward the storage based request to the logic circuit 402 of the controller device 102.

In one embodiment, the logic module 512 may be a set of instructions, which when executed may cause the logic circuit 402 of the controller device 102 to convert the network protocol to a NVME protocol. In one embodiment, the logic module 512 may communicate with the protocol conversion module 506 to convert the format of the data request (e.g., network protocol) to another format compatible with the storage device 308 (e.g., NVME protocol). In one embodiment, the protocol conversion module 506 may identify a protocol associated with the data request. In one embodiment, the protocol associated with the data request may be FC and/or iSCSI. In one embodiment, the protocol conversion module 506 may convert the network protocol to an NVME protocol through generating NVME commands corresponding to the data request. In one embodiment, the logic module may initiate a data flow through submitting (e.g., write) the NVME commands corresponding to the data request to a submission queue of a paired queue that resides in the memory of the controller device 102.

In one embodiment, the logic module 512 may communicate with the mapping module 502 to route the data request to the respective storage device 308 based on the mapping table. In one embodiment, the mapping module 502 may refer to a mapping table that includes an association of the controller device 102 and/or the server 106 to the storage device 308. In one embodiment, the logic module 512 may also route the storage based request from the controller device 102 to the processor 302 of the controller device 102. In one embodiment, the mapping table, may be a mapping of a logical volume presented to each host machine (e.g., server 106) to the logical volume of each individual storage device 308. In one embodiment, a typical disk may present itself to the host as one contiguous logical volume. In one embodiment, the storage device 308 may take this logical space (e.g., logical volume) presented by each disk and create a pool of multiple logical volumes which in turn is presented to the individual hosts. The mapping table may be a mapping from the logical volume presented to each host to the logical volume of each individual disks. The mapping table may be separate from a logical to physical mapping table or a physical to logical mapping table. In one embodiment, the mapping table may be functionally different from a logical to physical mapping table or a physical to logical mapping table. In one embodiment, the mapping table may be dynamically updated based on a status of the storage disk.

In one embodiment, the logic module 512 may communicate with the interrupt module 504 to process an entry of the completion queue made by the storage device 308. In one embodiment, a completion status may be forwarded to the corresponding server. In one embodiment, the interrupt module 504 may communicate with the logic module 512 to respond to an interrupt received from the storage device 308.

In one embodiment, the server 106 may communicate a storage based request with the storage device 308 of the disk array 104 through a virtual address of the storage device 308. In one embodiment, the logic module 512 may communicate with the translation module 508 to convert the virtual address associated with the storage device 308 to a physical address of the storage device 308. In one embodiment, the translation module 508 may refer to a translation table that includes an association of the virtual address of storage devices 308 with the physical address of the storage devices 308.

In one embodiment, the storage interface module 514 may issue commands to the storage interface circuit 408 to route the NVME commands to the appropriate storage device 308. In one embodiment, the storage interface circuit 408 may inform the storage device 308 of an entry in the submission queue. In one embodiment, the storage interface circuit 408 may communicate with the switch 306 to forward the NVME commands to the responsible storage device 308. The communication path of the data request and the control request may be referred to as data path and control path respectively hereafter. The routing of the data request and the control request are further described in the embodiment of FIG. 6.

Figure 6:
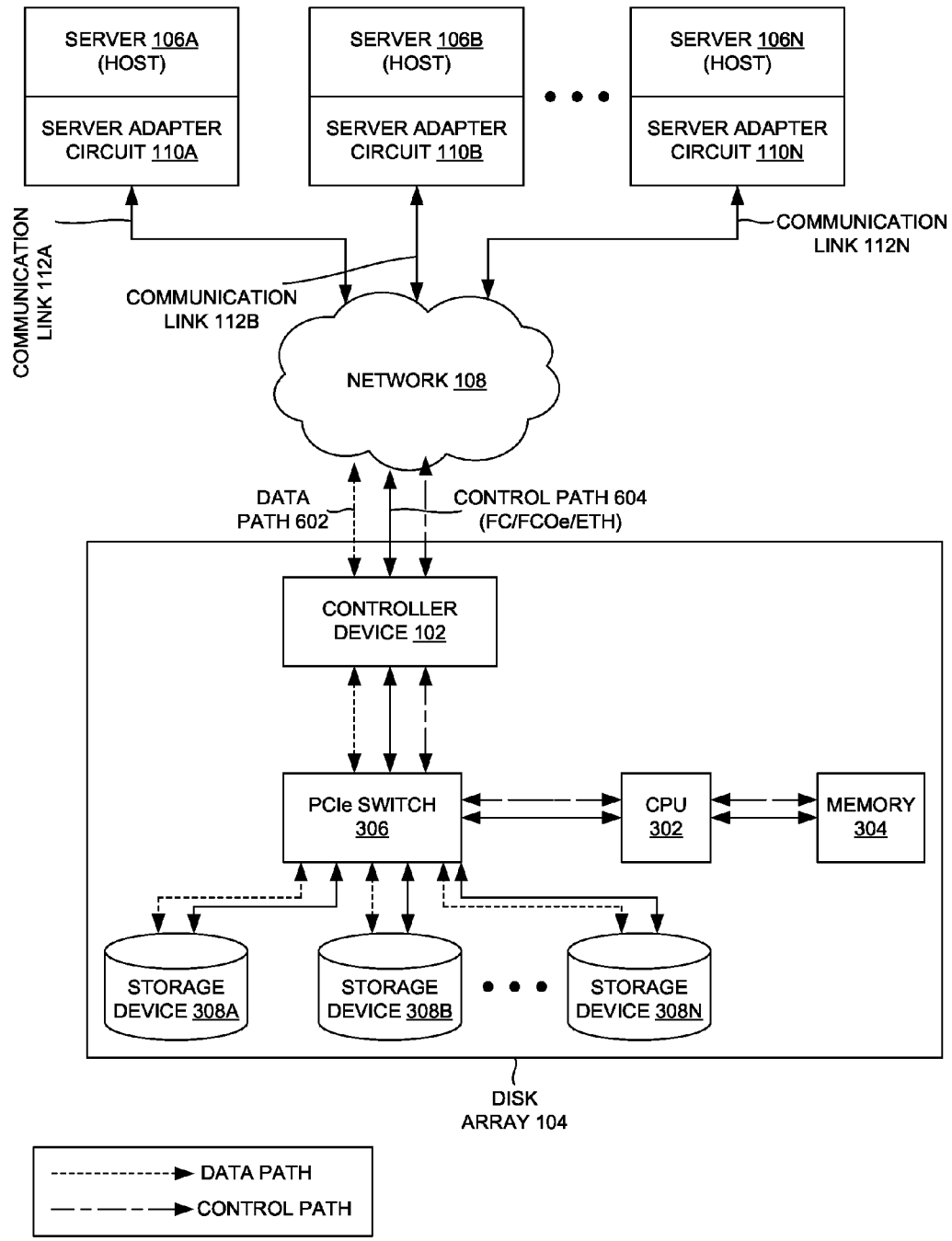
FIG. 6 illustrates a data path and a control path in the shared storage system, according to one or more embodiments.

Now refer to FIG. 6, FIG. 1, FIG. 3 and FIG. 4. FIG. 6 illustrates a data path and a control path in the shared storage system, according to one or more embodiments. In particular, FIG. 6 illustrates a number of servers 106a-n, server adapter circuits 110a-n, a network 108, communication links 112a-n, a disk array 104, a controller device 102, a data path 602, a control path 604, a switch 306, a number of storage devices 308a-n, a processor 302 and/or a memory 304.

In an example embodiment of FIG. 6, a server 106a (e.g., host system) may generate a storage based request and/or receive a storage based request from a client device (not shown in FIG. 6). In one embodiment, the server 106a may forward the storage based request to the disk array 104 through the network 108. In one embodiment, the storage based request may be communicated to the disk array through a communication link 112a. In one embodiment, the communication link 112a may employ a fiber channel protocol and/or iSCSI protocol to communicate the storage based request to the disk array 104 via the network 108. In one embodiment, the controller device 102 of the disk array 104 may receive the storage based request from the server 106a via the network 108.

In the example embodiment, if the storage based request is a SCSI command the storage based requests may be placed (e.g., written) in a SCSI queue (not shown in FIG. 6). In one embodiment, the queue may be managed through a buffer management module (not shown in FIG. 6). In one embodiment, the SCSI commands residing in the SCSI queue may be decoded before the storage based request is converted to a NVME protocol from the SCSI protocol. In one embodiment, the SCSI command from the server 106 may be compressed before they are transmitted to the disk array 104 via the network 108. In one embodiment, they may be compressed to efficiently utilize the network bandwidth. In one embodiment, the SCSI commands may be decompressed at the controller device 102.

In one embodiment, the controller device 102 may distinguish the storage based request as a data request and/or a control request. In one embodiment, the data request may be a data write request and/or data read request. In one embodiment, the data write request and/or data read request may include a parameter that indicates the address of the storage device 308 to which the data is to be written and/or the address of the storage device 308 from which a data must be read. In one embodiment, the address associated with the storage device 308 included in the data request may be a virtual address of the storage device. In one embodiment, the controller device 102 may translate the virtual address associated with the storage device to a physical address of the storage device through a translation module 508. In one embodiment, the controller device may refer to a translation table to translate the virtual address to a physical address. In one embodiment, an entry of the translation table may indicate a virtual address and the corresponding physical address of the virtual address on the storage device 308. In one embodiment, the translation table may be merged with a mapping table. In one embodiment, an entry of the mapping table may include an association of the controller device 102 and/or server 106a with a corresponding storage device of the number of storage devices 308a-n. In one embodiment, the controller device 102 may determine the storage device associated with the controller device 102 and/or the server 106a through the mapping table. In one embodiment, once the storage device 308 associated with the server 106a and/or the controller device 102 has been determined, the controller device 102 may convert the SCSI commands to a corresponding NVME command through a protocol conversion module 506 of the controller device 102. In one embodiment, a logic module 512 and/or the storage interface module 514 of the controller device 102 may initiate a data flow through submitting the NVME command corresponding to the data request in a submission queue of a paired queue associated with the respective storage device 308. In one embodiment, the storage interface module 514 may alert the storage device 308 of an entry in the submission queue associated with the storage device 308. In one embodiment, the storage device may access the submission queue residing in the controller device and process the corresponding command.

In one embodiment, the storage device 308 may communicate with the controller device 102 through the switch 306. In one embodiment, the data request may be routed to the respective storage device 308 (e.g., 308a). In one embodiment, routing the data request from the controller device 102 to the storage device 308 may be agnostic to the processor 302. In one embodiment, the controller device 102 may route the data request directly from the controller device 102 to the appropriate storage device by by-passing the processor 302. In one embodiment, the data path 602 may be a path taken by the data request. In one embodiment, the data path may start from a server 106 (e.g., 106a) and may reach the controller device 102 through the network 108. The data path 602 may further extend from the controller device 102 directly to the storage device 308 through the switch 306.

In one embodiment, the control path 604 may be a path taken by the control request. In one embodiment, the control path 604 may start from the server 106 (e.g., 106a) and reach the controller device 102 through the network 108. The control path 604 may further extend from the controller device 102 to the processor 302. In one embodiment, the controller device 102 may route all the control requests to the processor 302. In one embodiment, the processor 302 may communicate with the number of storage devices 308a-n to gather information required according to the control request. In another embodiment, each storage device 308 of the number of storage devices 308a-n may send a status of the storage device of the number of storage devices 308a-n to the processor 302. The processor 302 may have a record of the status of the storage devices 308a-n.

In one embodiment, once the data request is processed by the storage device 308, the storage device 308 may issue an interrupt to the controller device 102. In one embodiment, the storage device 308 may issue and interrupt to the controller device 102 based on an interrupt table. In one embodiment, the interrupt module 514 of the controller device may handle the interrupt from the storage device 308. In one embodiment, the controller device may read the completion queue when it receives an interrupt form the storage device 308. The process of handling a control request and/or a data request may be further described in FIG. 7A and FIG. 7B.

Figure 7A:
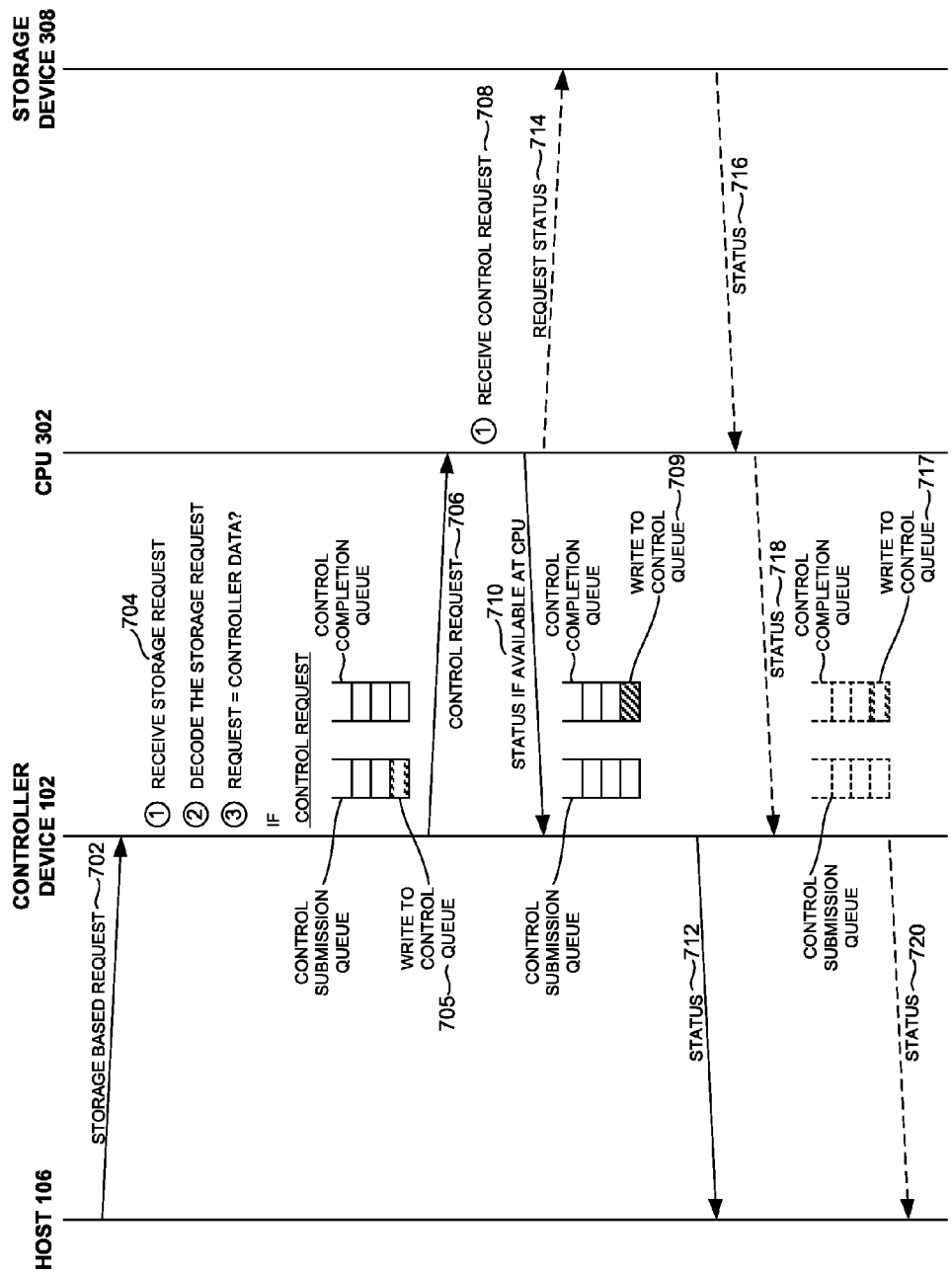
FIG. 7A is a flow diagram that illustrates the control path in the shared storage system including the controller device, according to one or more embodiments.
Figure 7B:
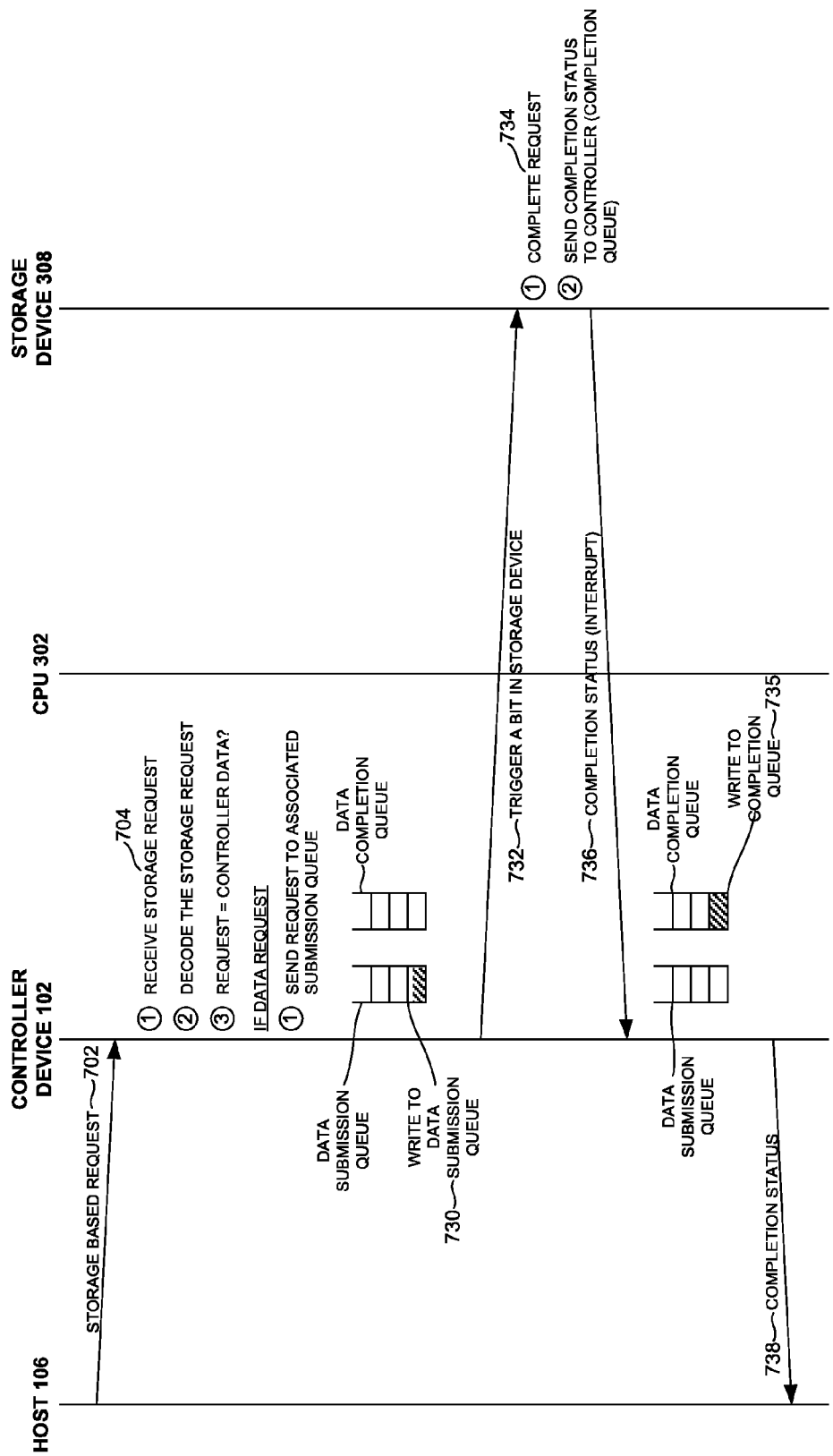
FIG. 7B is a flow diagram that illustrates the data path in the shared storage system including the controller device, according to one or more embodiments.

Now refer to FIG. 7A, FIG. 7B and FIG. 6. FIG. 7A is a flow diagram that illustrates the control path in the shared storage system including the controller device, according to one or more embodiments. In particular, FIG. 7A illustrates a server 106 (host device), a controller device 102, a processor 302 and/or a storage device 308.

In one embodiment, in operation 702 the server 106 may transmit a storage based request to the controller device 102. In one embodiment, in operation 704, the controller device may receive the storage based request through the adapter circuit 404. In one embodiment, the controller device 102 may decode the storage based request to distinguish the storage based request and/or a nature of the storage based request as a control request and/or a data request. In one embodiment, if the storage based request is a control request, the controller device 102 may route the control request to the processor 302 in operation 706. In one embodiment, in operation 708, the processor 302 may receive the control request. In one embodiment, the controller device 102 may route the control request to the controller device. In one embodiment, the controller device 102 may route the control request to the processor 302 through writing the control request to control queue residing locally in the controller device 102 or the processor memory 304 (e.g., Operation 705). In one embodiment, the controller device 102 may alert the processor 302 of an entry in the control submission queue. In one embodiment, the processor 302 may fetch the control request from the queue (e.g., Operation 706).

In one embodiment, the processor 302 may have a status of all the storage devices 308a-n of the disk array. In one embodiment, the processor 302 may forward a status of the storage device 308 (e.g., 308a) to the controller device 102 based on the control request, in operation 710. In one embodiment, the processor may forward the status of the storage device 308 through writing a completion status in the completion control queue (e.g., Operation 709). In one embodiment, the processor 302 may issue an interrupt before and/or after the completion status is written in the completion queue. In one embodiment, the controller device 102 may forward a response to the control request to the server 106, in operation 712.

In one embodiment, if the processor 302 does not have the status of the requested storage device 308, the processor 302 may request a status from the storage device 308 in operation 714. In one embodiment, in operation 716, the storage device 308 may respond to the processor 302 with a status of the storage device 308. In one embodiment, the status of the storage device and/or completion of the control request may be transmitted to the server 106 that issued the control request through operation 718, 719 and/or 720.

FIG. 7B is a flow diagram that illustrates the data path in the shared storage system including the controller device, according to one or more embodiments. In particular, FIG. 7B illustrates a server 106 (host device), a controller device 102, a processor 302 and/or a storage device 308.

In one embodiment, in operation 702 the server 106 may transmit a storage based request to the controller device 102. In one embodiment, in operation 704, the controller device may receive the storage based request through the adapter circuit 404. In one embodiment, the controller device 102 may decode the storage based request to distinguish the storage based request as a control request and/or a data request. In one embodiment, if the storage based request is a data request, the controller device 102 may route the data request directly to the respective storage device 308, bypassing the processor 302. In one embodiment, the controller device 102 may route the data request to the storage device 308 through writing the data request (e.g., corresponding NVME command) in the submission queue associated with the storage device 308, in operation 730. In one embodiment, the controller device may alert the storage device of an entry in the submission queue associated with the storage device 308 in operation 732. In one embodiment, the controller device 102 may alert the storage device 308 through changing an associated bit (e.g., may be 1 bit that indicates an event) in the storage device that may indicate an entry in the submission queue associated with the storage device 308.

In one embodiment, the storage device 308 may fetch the data request from the submission queue and process the data request in operation 734. Also in operation 734, when the data request is processed the storage device 308 may write a completion status in the completion queue associated with the storage device 308. In one embodiment, a completion status may indicate that the data request in the submission queue has been processed. In one embodiment, the storage device 308 may send an interrupt signal to the controller device 102 once the completion status has been written into the completion queue. In one embodiment, the completion status may be entered in the completion queue after an interrupt is issued. In one embodiment, in operation 735 an entry may be made to the completion queue. In one embodiment, in operation 736, the controller device 102 may read the completion status from the completion queue and then in operation 738, the controller device 102 may forward the completion status to the server 106 that issued the data request.

Figure 8:
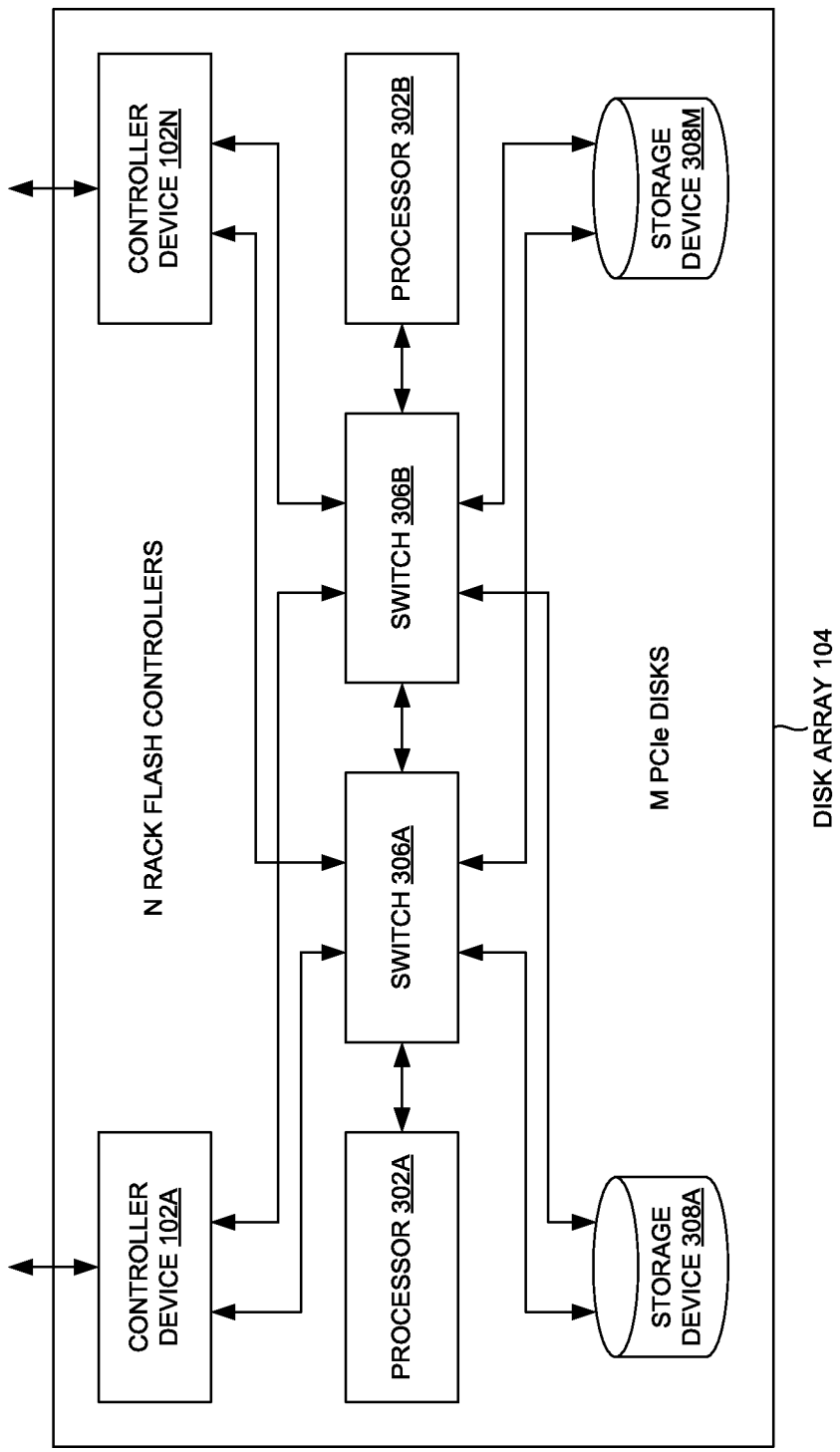
FIG. 8 illustrates system architecture of a shared system of FIG. 1 that is scaled using a number of controller devices, according to one or more embodiments.

In another embodiment of FIG. 1, the shared storage system 100 may have a number of controller devices 102a-n, as illustrated in FIG. 8. Now refer to FIG. 1 and FIG. 8. FIG. 8 illustrates a system architecture of a shared system of FIG. 1 that is scaled using a number of controller devices, according to one or more embodiments. In particular, FIG. 8 illustrates a number of controller devices 102a-n, a number of processors 302a-b, a number of switches 306a-b and/or a number of storage devices 308a-n.

In an example embodiment, the paired queue (submission and completion) of the storage device 308a that represents a submitted storage request and a completed storage request respectively may be associated with the controller device 102a. In one embodiment, the architecture of the disk array 104 may be made scalable through associating the pair of the submission queue and the completion queue of the storage device 308 with a controller device 102. In one embodiment, a storage device 308a may be mapped to a number of controller devices 102a-n through associating the paired queue of the storage device 308a to each of the number of controller device 102a-n. In another embodiment, a controller device 102a may be mapped to a number of storage devices 308a-n. In one embodiment, scaling the shared storage system through mapping one controller device 102 to a number of storage devices and mapping one storage device to a number of controller devices may be enable sharing a storage device (PCIE disk) with a number of controller devices 102a-n. In one embodiment, data associated with the data requests may be striped across a number of storage disks 308a-n. In one embodiment, striping data across a number of storage devices 308a-n may provide a parallelism effect.

In one embodiment, bypassing the processor 302 in the data path 602 may enable a scaling of the shared storage system as shown in FIG. 8. In one embodiment, the shared storage system may be made scalable when a single controller device may access (through being mapped) a number of PCIe drives (e.g., storage devices 308a-n). In one embodiment, the number of controller devices 102a-n may be coupled to a number of storage devices 308a-n through a number of switches 306a-b. In one embodiment, the disk array 104 may have multiple processors 302a-b. In one embodiment, the controller device 102 may be included with the server 106 to provide a virtual NVMe service at the server 106. The virtual NVME may be further disclosed in FIG. 2A and FIG. 2B.

Figure 2A:
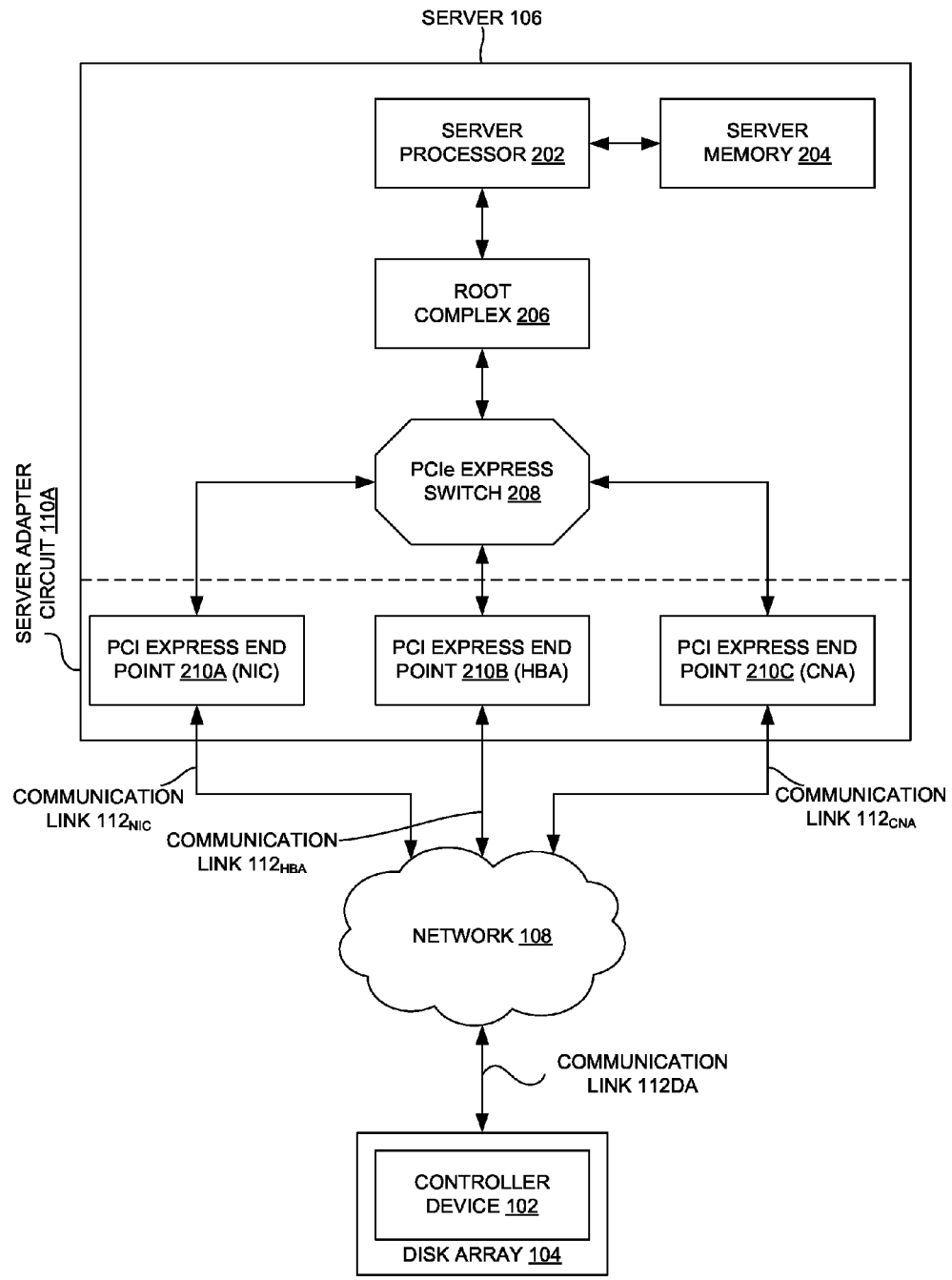
FIG. 2A illustrates an exploded view of the server in FIG. 1, according to one or more embodiments.
Figure 2B:
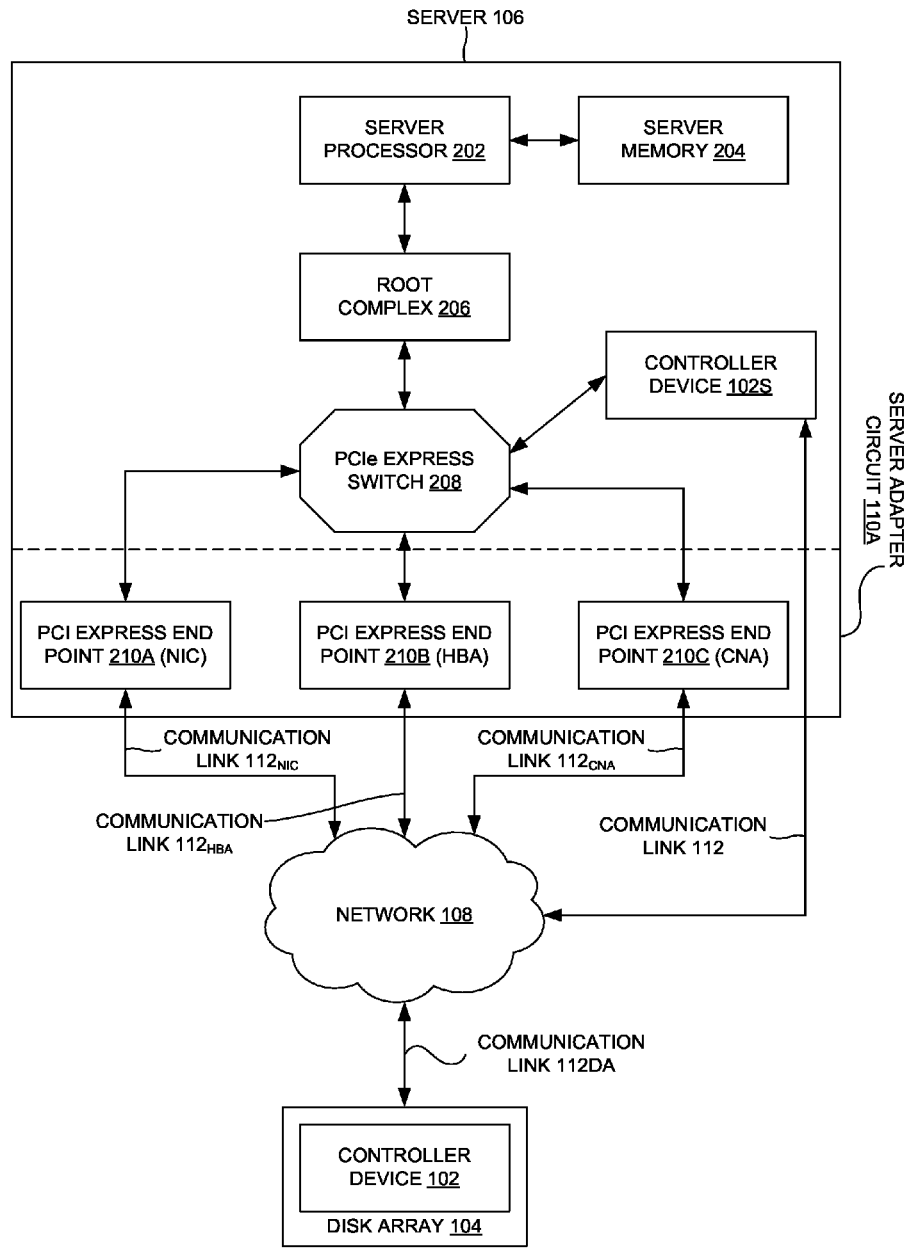
FIG. 2B illustrates a server architecture including the controller device, according to one or more embodiments.

Now refer to FIG. 2A and FIG. 2B. FIG. 2A illustrates an exploded view of the server in FIG. 1, according to one or more embodiments. In particular, FIG. 2A illustrates a server 106, a server processor 202, a server memory 204, a root complex 206, a switch 208, a number of PCIE end points 210a-c, a network 108, a number of communication links 112nic, 112hba and 112cna, a controller device 102 and/or a disk array 104.

In one embodiment, the server processor 202 may initiate a discovery when the server processor 202 powers up. In one embodiment, the server processor 202 may send a discovery request (e.g., configuration packet) to the switch 208 (e.g., PCIE switch). In one embodiment, the switch 208 may broadcast the discovery request to the number of PCIE end points 210a-c. In one embodiment, the switch may route requests through an identifier based routing (e.g., bus, device and function (BDF) identifier) and/or an address based routing.

In one embodiment, the root complex 206 may assign a device address to each of the PCIE end points 210a-n. In one embodiment, the root complex 206 may be the master. In one embodiment, an application (associated with the server 106) may write a storage based request to the server memory 204. In one embodiment, the PCIE end point (e.g., 112a, 112b or 112c) may fetch the data from the server memory 204. In one embodiment, the PCIE end point 112 (112a, 112b or 112c) may transmit the storage based request from the server to the disk array 104 through the network 108. In one embodiment, the PCIE end point 112 may interface with the switch 208.

In one embodiment, the controller device 102 receives the storage based request from the server and may process the storage based request. In one embodiment, if the storage based request is a data request, the storage based request may be forwarded to a storage device through the controller, by-passing the processor 302 of the disk array 104. In one embodiment, the controller device 102 may be installed on the server 106.

Now refer to FIG. 2B. FIG. 2B illustrates a server architecture including the controller device, according to one or more embodiments. In particular FIG. 2B illustrates a server 106, a server processor 202, a server memory 204, a root complex 206, a switch 208, a number of PCIE end points 210a-c, a network 108, a number of communication links 112nic, 112hba and 112cna, a controller device 102, a disk array 104 and/or a controller device 102s.

In one embodiment, the server processor 202 may initiate a discovery when the server processor 202 powers up. In one embodiment, the server processor 202 may send a discovery request (e.g., configuration packet) to the switch 208 (e.g., PCIE switch). In one embodiment, the switch 208 may broadcast the discovery request to the number of PCIE end points 210a-c. In one embodiment, the switch may route requests through an identifier based routing (e.g., bus, device and function (BDF) identifier) and/or an address based routing.

In one embodiment, the root complex 206 may assign a device address to each of the PCIE end points 210a-n. In one embodiment, the root complex 206 may be the master. In one embodiment, the controller device 102s in the server 106 may portray characteristics of a PCIE end point. In one embodiment, the controller device 102s in the server 106 may appear to the server processor 202 and/or root complex 206 as a PCIE solid state storage device directly plugged to the server 106.

In one embodiment, an application (associated with the server 106) may write a storage based request to the server memory 204. In one embodiment, the server processor 202 and/or the root complex 206 may trigger a bit in the controller device 102s to alert the controller device 102s of an entry in the server memory 204. The controller device 102s may fetch the storage based request and forward it to the controller device 102 in the disk array 104. In one embodiment, the controller device of the server 102s may communicate the storage based request to the disk array 104 through a communication link 112. The communication link 112 may be FC, Ethernet and/or FCoE. In one embodiment, the controller device 102s may have a unique interface of its own to communicate with the network which is different from FC, Ethernet and/or FCoE. The controller device 102s may be provide virtual NVME experience at the host machine (e.g., server 106).

In one embodiment, an NVMe based PCIe disk may include a front end NVMe controller and backend NAND flash storage. A virtual NVMe controller card (controller device 102s) may include an NVMe front end and the back end storage part may be replaced by an Ethernet MAC, in an example embodiment of FIG. 2B. The host machine (e.g., server 106) may think it's interfacing with a standard NVMe PCIe disk. However, instead of the storage being local it will be remotely accessed over the Ethernet network, in the example embodiment. The host driver may then generate the NVMe commands. In the example embodiment, the logic behind the virtual NVMe controller may encapsulate these NVMe commands into Ethernet packets and route them to the appropriate controller device 102 of the disk array 106, where it may be de-encapsulated and forwarded to the real PCIe disk with the appropriate address translation. In an example embodiment of FIG. 8, the controller device 102 of the disk array 106 may get simplified as all it needs to do is address translation as the protocol remains the same (e.g., since the protocol translation to NVME may have been performed at the controller device 102s on server side (host machine).

Figure 9:
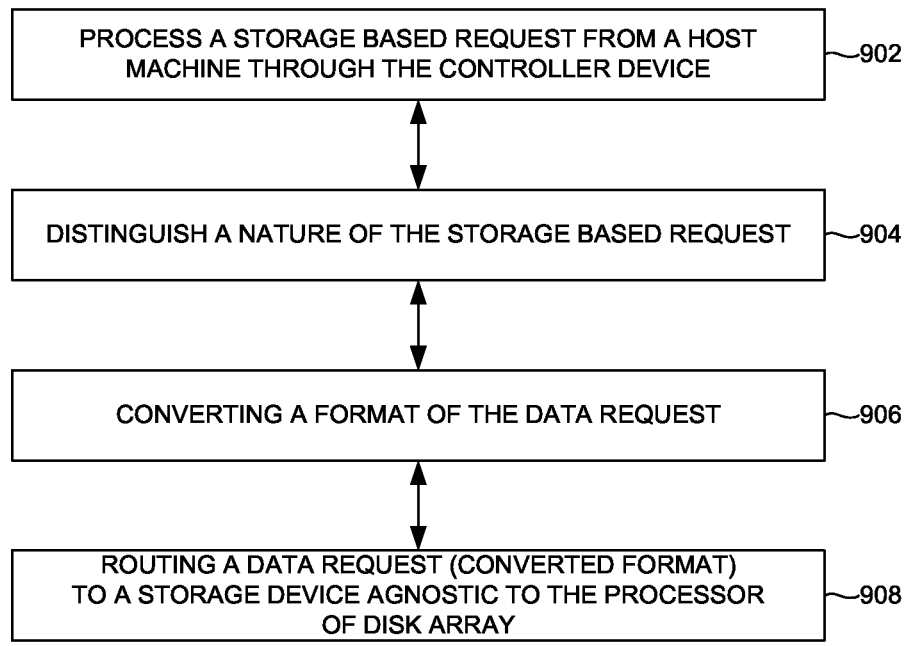
FIG. 9 is a process flow diagram illustrating a method of processor agnostic data storage in a PCIE based shared storage environment, according to one or more embodiments.

FIG. 9 is a process flow diagram illustrating a method of processor agnostic data storage in a PCIE based shared storage environment, according to one or more embodiments. In one embodiment, in operation 902, a storage based request received at an adapter circuit of a controller device associated with a disk array from a host machine that is at a remote location from the disk array through a network via the controller device may be processed to direct the storage based request to at least one of a processor of the disk array and a plurality of storage devices of the disk array. In one embodiment, in operation 904, a nature of the storage based request may be distinguished to be at least one of a data request and a control request via a logic circuit of the controller device through decoding the storage based request based on a metadata of the storage based request. In one embodiment, in operation 906, a format of the data request may be converted to another format compatible with the plurality of storage devices through the logic circuit of the controller device. In one embodiment, in operation 908, the data request in the other format compatible with the storage device may be routed through an interface circuit of the controller device, to at least one storage device of the plurality of storage devices of the disk array coupled to the controller device agnostic to a processor of the disk array to store a data associated with the data request based on a mapping table, residing in a memory of the controller device that is mapped in a memory of the disk array, that represents an association of the at least one storage device of the plurality of storage devices to the controller device.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware, firmware and software (e.g., embodied in a machine readable medium). For example, the various electrical structure and methods may be embodied using transistors, logic gates, and electrical circuits (e.g., application specific integrated (ASIC) circuitry and/or in digital signal processor (DSP) circuitry).

In addition, it will be appreciated that the various operations, processes, and methods disclosed herein may be embodied in a machine-readable medium and/or a machine accessible medium compatible with a data processing system (e.g., a computer devices), may be performed in any order (e.g., including using means for achieving the various operations). Accordingly, the specification and drawings are to be regarded in an illustrative rather than a restrictive sense.

What is claimed is:

1. A method comprising:

receiving, by a first controller device of a plurality of controller devices associated with a disk array that comprises a plurality of storage devices and a processor, a request from a host machine that is at a remote location from the disk array, wherein the plurality of storage devices comprise Peripheral Component Interconnect Express (PCIE) based solid state storage devices;

determining, by the first controller device, a nature of the request to be at least one of a data request or a control request based on metadata of the request;

responsive to determining that the request is a data request, performing the following comprising:

converting, by the first controller device, a format of the data request from a first format to a second format that is compatible with the plurality of storage devices, wherein the first format is a format other than a non-volatile memory express (NVMe) format, and wherein converting the data request to the second format comprises converting the data request to the NVMe format; and routing the data request in the second format directly to at least one storage device of the plurality of storage devices, bypassing the processor of the disk array, based on a mapping table, residing in a memory of the first controller device, that represents an association of the at least one storage device to the first controller device, the association comprising first locations on the at least one storage device that are accessible to the first controller device, wherein at least one of the mapping table or an additional mapping table further represents an additional association of the at least one storage device to a second controller device of the plurality of controller devices, the additional association comprising second locations on the at least one storage device that are accessible to the second controller device.

2. The method of claim 1, further comprising:

associating the at least one storage device to the first controller device;

recording an association of the at least one storage device to the first controller device in the mapping table; and storing the mapping table representing the association of the at least one storage device to the first controller device in the memory of the first controller device, wherein the memory of the first controller device is mapped in a memory of the disk array.

3. The method of claim 2, further comprising:

dynamically updating the association of the at least one storage device to the first controller device based on a status of the at least one storage device;

directing, by the first controller device, a control request from the host machine to the processor; and processing the control request by the processor.

4. The method of claim 2, wherein associating the at least one storage device to the first controller device comprises:

associating a pair of queues comprising a submission queue of the storage device that represents a submitted storage request and a completion queue of the storage device that represents a completed storage request with the first controller device, wherein the pair of queues is to reside in the memory of the first controller device.

5. The method of claim 1, further comprising:

adding the data request from the host machine to a submission queue of the at least one storage device, wherein the submission queue resides in the memory of the first controller device;

sending an alert of the data request in the submission queue to the at least one storage device, wherein the at least one storage device is to process the data request entered in the submission queue responsive to receiving the alert.

6. The method of claim 5, further comprising:

issuing an interrupt from the at least one storage device to the first controller device responsive to the at least one storage device processing the data request entered in the submission queue;

writing a completion status associated with the data request in a completion queue that is associated with the submission queue responsive to the at least one storage device of the plurality of storage devices processing the data request; and updating the submission queue and the completion queue.

7. The method of claim 1, wherein converting the format of the data request from the first format to the second format comprises translating, by the first controller device, a virtual address associated with the at least one storage device that is included in the storage based request to a physical address of the at least one storage device based on an address translation table stored in the memory of the first controller device, the method further comprising:

communicatively coupling the first controller device to the at least one storage device through an interface circuit of the first controller device via a Peripheral Component Interconnect Express (PCIE) switch.

8. A controller device, comprising:

an adapter circuit to receive a request from a host machine;

a logic circuit, coupled to the adapter circuit, to:

determine a nature of the request to be at least one of a data request or a control request based on metadata of the request; and convert a format of the request from a first format to a second format compatible with a plurality of storage devices of a disk array responsive to a determination that the request is a data request, wherein the plurality of storage devices comprise Peripheral Component Interconnect Express (PCIE) based solid state storage devices, wherein the first format is a format other than a non-volatile memory express (NVMe) format, and wherein converting the data request to the second format comprises converting the data request to the NVMe format; and an interface circuit, coupled to the logic circuit, to route the data request in the second format to at least one storage device of the plurality of storage devices of the disk array, bypassing a processor of the disk array, based on a mapping table, residing in a memory of the controller device that is mapped in a memory of the disk array, that represents an association of the at least one storage device to the controller device, the association comprising first locations on the at least one storage device that are accessible to the controller device, wherein at least one of the mapping table or an additional mapping table further represents an additional association of the at least one storage device to an additional controller device, the additional association comprising second locations on the at least one storage device that are accessible to the additional controller device.

9. A disk array comprising:
a plurality of storage devices, wherein the plurality of storage devices comprise Peripheral Component Interconnect Express (PCIE) based solid state storage devices;
a processor; and
a first controller device coupled to the processor and to the plurality of storage devices, the first controller device comprising:
   an adapter circuit to receive a request from a host machine;
   a logic circuit to distinguish a nature of the request to be at least one of a data request or a control request based on metadata of the request, and to convert a format of the request from a first format to a second format that is compatible with the plurality of storage devices responsive to a determination that the request is a data request, wherein the first format is a format other than a non-volatile memory express (NVMe) format, and wherein converting the data request to the second format comprises converting the data request to the NVMe format; and
   an interface circuit to route the data request in the second format to at least one storage device of the plurality of storage devices, bypassing the processor, based on a mapping table, residing in a memory of the first controller device, that represents an association of the at least one storage device to the first controller device, the association comprising first locations on the at least one storage device that are accessible to the first controller device; and
a second controller device coupled to the processor and to the plurality of storage devices, the second controller device comprising an additional interface circuit to route an additional data request in the second format to the at least one storage device of the plurality of storage devices, bypassing the processor, based on at least one of the mapping table or an additional mapping table, residing in an additional memory of the second controller device, that represents an additional association of the at least one storage device to the second controller device, the additional association comprising second locations on the at least one storage device that are accessible to the second controller device.

10. The disk array of claim 9, wherein the processor is to:
associate the at least one storage device to the first controller device;
record an association of the at least one storage device to the first controller device in the mapping table; and
store the mapping table representing the association of the at least one storage device to the first controller device in the memory of the first controller device, wherein the memory of the first controller device is mapped in the memory of the disk array.

11. The disk array of claim 9, wherein:
the first controller device is further to direct the storage based request to the processor responsive to a determination that the storage based request is a control request; and
the processor is further to process the control request.

12. The disk array of claim 9, wherein associating the at least one storage device to the first controller device comprises:
associating a pair of queues comprising a submission queue of the storage device that represents a submitted storage request and a completion queue of the storage device that represents a completed storage request with the first controller device, wherein the pair of queues is to reside in the memory of the first controller device that is mapped in the memory of the disk array.

13. The disk array of claim 9, wherein:
the first controller device is further to add the data request from the host machine to a submission queue of the at least one storage device, wherein the submission queue resides in the memory of the first controller device, and alert the at least one storage device of the data request entry in the submission queue; and
the at least one storage device of the plurality of storage devices is to process the data request entered in the submission queue responsive to receiving the alert from the first controller device.

14. The disk array of claim 13, wherein one of the processor or the at least one storage device is to:
issue an interrupt to the first controller device in response to the at least one storage device processing the data request entered in the submission queue;
write a completion status associated with the data request in a completion queue that is associated with the submission queue in response to the at least one storage device of the plurality of storage devices processing the data request; and
update the submission queue and the completion queue.

15. The disk array of claim 9, wherein converting the format of the data request from the first format to the second format comprises translating a virtual address associated with the at least one storage device that is included in the storage based request to a physical address of the at least one storage device based on an address translation table stored in the memory of the first controller device.

16. The disk array of claim 9, wherein the interface circuit comprises a Peripheral Component Interconnect Express (PCIE) switch that communicatively couples the first controller device to the at least one storage device.

* * * * *